United States Patent [19]

Judge, Jr.

[11] 4,416,130
[45] Nov. 22, 1983

[54] PULSING IMPACT STRAIGHTENER

[75] Inventor: Edward E. Judge, Jr., Lansing, Mich.

[73] Assignee: Industrial Metal Products Corporation, Lansing, Mich.

[21] Appl. No.: 245,890

[22] Filed: Mar. 20, 1981

[51] Int. Cl.³ ................................. B21K 1/08
[52] U.S. Cl. .......................... 72/10; 72/53; 72/76; 29/6
[58] Field of Search ............ 72/10, 12, 30, 53, 76; 29/6

[56] References Cited

U.S. PATENT DOCUMENTS

| | | | |
|---|---|---|---|
| 2,888,846 | 6/1959 | Peras | 29/6 |
| 3,208,250 | 9/1965 | Fournier | 72/10 |
| 3,335,587 | 8/1967 | Blachut et al. | 72/10 |
| 3,491,566 | 1/1970 | Hurd | 72/76 |
| 3,948,076 | 4/1976 | Eitel et al. | 29/6 |
| 3,986,380 | 10/1976 | Biggs | 72/76 |
| 4,226,111 | 10/1980 | Wahli | 72/53 |

Primary Examiner—Lowell A. Larson

[57] ABSTRACT

An automatic production workpiece straightener employing pulsing impact hammer peening blows on the concave curvature side of a distorted workpiece to straighten by imparting compressive stress to the surface fibers thereby permanently deflecting the workpiece in a straightening direction. As applied to rotatable shafts such as cast iron camshafts, a plurality of peening heads deliver rapidly pulsing axially spaced impact blows to cylindrical grooves in the shaft during a limited portion of each continuous revolution as required to provide straightening action with continuous or peening-interrupted automatic gauging for controlling and terminating the straightening action.

42 Claims, 17 Drawing Figures

PULSING IMPACT STRAIGHTENER

BACKGROUND OF THE INVENTION

Prior art straighteners conventionally apply bending loads to the convex side of distortion deflecting the workpiece through the elastic limit to a point where springback results in a part straightened within tolerance. In some cases the elongated workpiece is rotated to bring the high point under one or plural longitudinally spaced rams which deflect the part beyond yield while rotationally stationary on spaced supports. In other cases the shaft may be rotated during deflection with gradual retraction of the deflecting load to achieve automatic straightening within tolerance.

Such prior art straightening through bending has limitations, particularly as applied to brittle materials such as cast iron which are substantially weaker under surface tension than under compression. Cast iron camshafts are a case in point where a high percentage of scrap is encountered from heat treat distortions which exceed the possibility of straightening through bending which subjects the concave surface of distortion to excessive tensile stress during straightening deflection.

The prior art includes attempts to minimize tensile stress during straightening deflection by applying end compressive loading to the workpiece during deflection and thereby exceed the elastic limit on the compression side of the bending load.

While it is known that peening places surface fibers under compressive stress, applicant is unaware of any production straightening method or apparatus which will automatically impose peening blows on a production workpiece as required to achieve straightening action.

SUMMARY OF THE PRESENT INVENTION

In a preferred embodiment of the present invention, as applied to cast iron camshafts, six peening tools longitudinally spaced along the length of the camshaft, three each on opposite sides, are operated as rapidly pulsing air hammers impacting radiused tool ends in longitudinally spaced cylindrical grooves between cam lobes during continuous camshaft rotation with programmable controls limiting each peening head's operation to a portion of the half cycle of rotation during which concave curvature of the camshaft is facing each peening tool thereby compressively peening the surface fibers on the side required for straightening action. In a cylindrical area of the camshaft substantially wider than the peening tool, provision is made to oscillate the tool longitudinally of the camshaft while imparting peening blows normal to the camshaft axis in order to effectively compressively stress a substantial width of such area.

A programmable controller is provided with an automatic straightening program which is responsive to an initial gauged single revolution of the camshaft and determines which of the peening heads are to be operative and over what fractional cycle of rotation relative to the corresponding sector of distortion.

The apparatus includes provision for dampening deflection vibration of the camshaft from the peening blows by dampening heads engaging intermediate longitudinally spaced cylindrical bearing surfaces of the camshaft during straightening rotation. Gauging of such intermediate spaced cylindrical surfaces when performed during peening is accomplished preferably through magnetic or air gauge heads which do not directly contact the workpiece and accordingly are free of vibration from the peening blows. For maximum accuracy in meeting close tolerance requirements, peening is periodically interrupted during programmed rotational gauging redetermining distortion planes, operative peening heads, effective peening arcs, and completion of straightening cycle. Optional magnetic gauging heads responsive to a variable air gap may employ a control button for engaging a camshaft bearing to minimize reading variations incident to workpiece material variations.

Rotation of the camshaft on dead centers is provided, e.g. at a fixed rate of 30 rpm or preferably with adjustable variable speed in the range of 20–60 rpm, during continuous or peening-interrupted gauging and straightening operations with automatic shutoff upon straightening within tolerance. The higher speed leading to closer final tolerance due to fewer peening impacts per revolution over the prevailing peening arc. Camshafts from a feed chute are automatically loaded through a transfer apparatus to and from the straightening station and an average net straightening cycle of approximately ⅓ minute has been achieved.

Figures 1, 4:
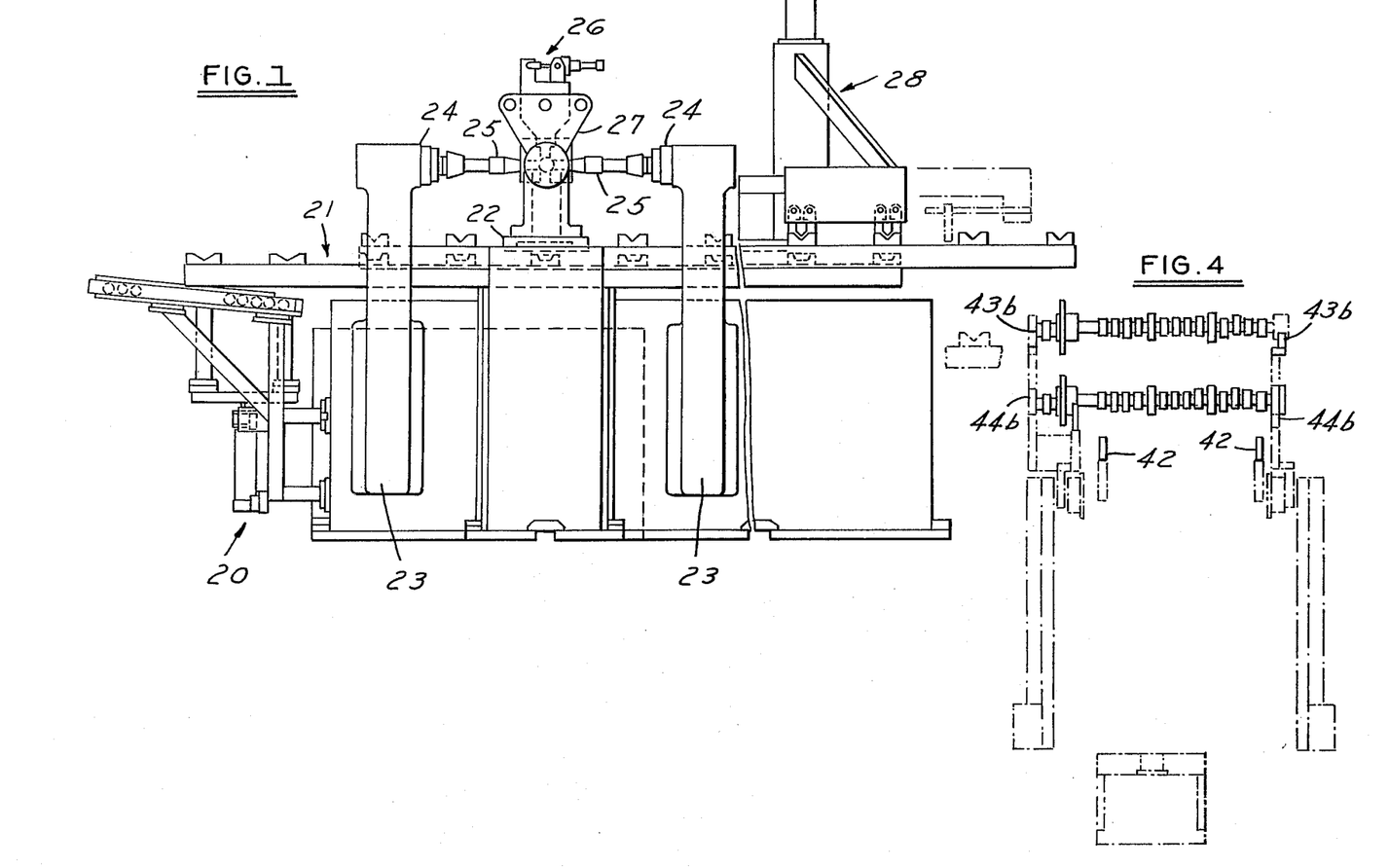
FIG. 1 is a side elevation of a camshaft straightener in accordance with the present invention taken in a direction axial of the camshaft.
FIG. 4 is a schematic end view illustrating transfer and straightening elevations of the camshaft.
Figure 2:
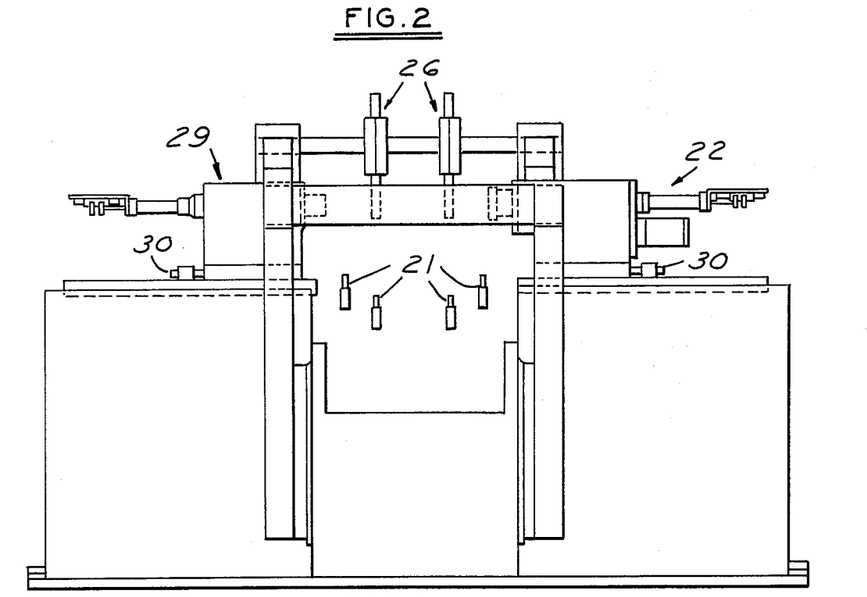
FIG. 2 is an end view of the straightener shown in FIG. 1.
Figure 9:
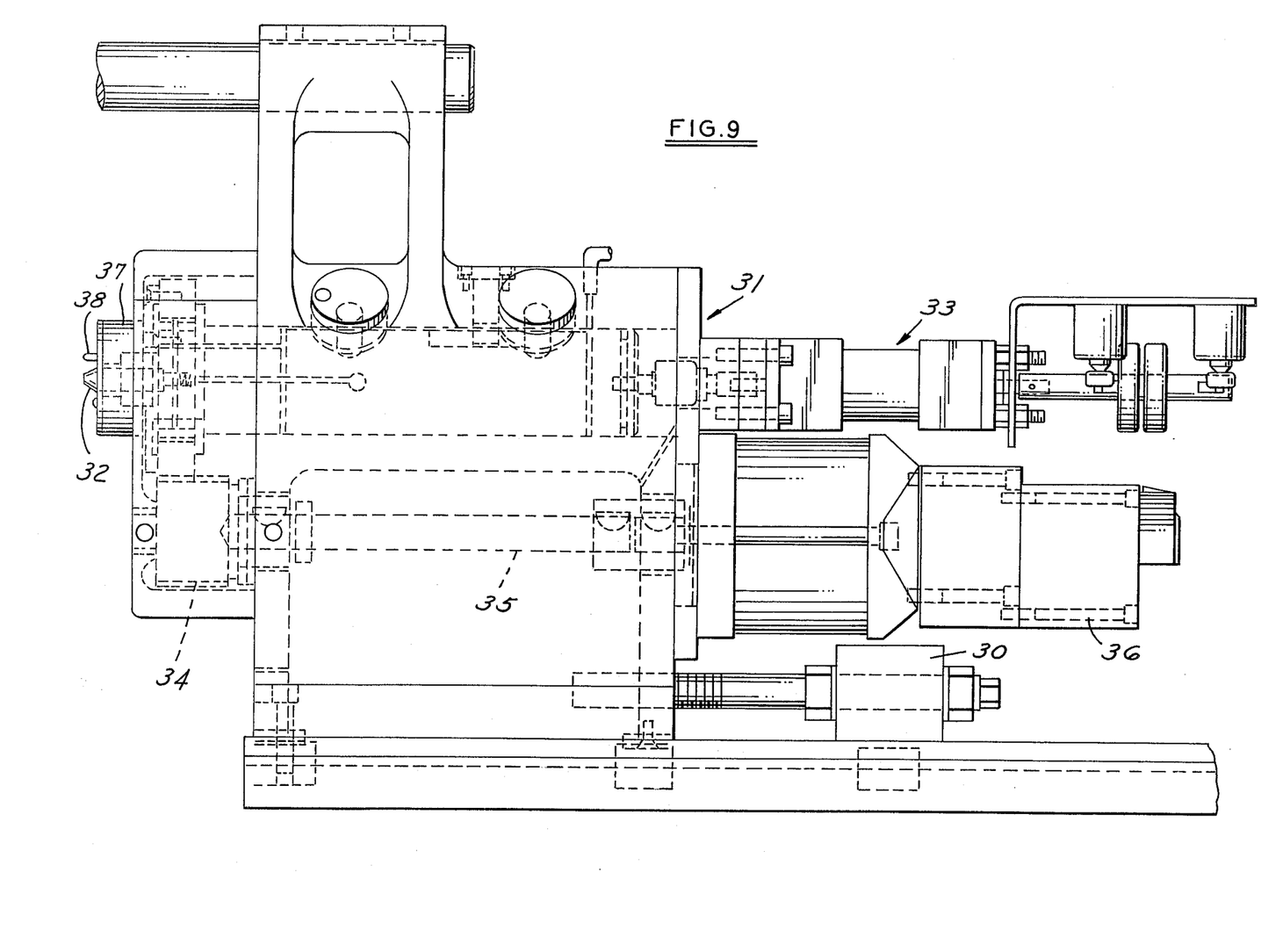
FIG. 9 is an elevation view of the head stock employed in driving the camshaft during straightening.
Figure 10:
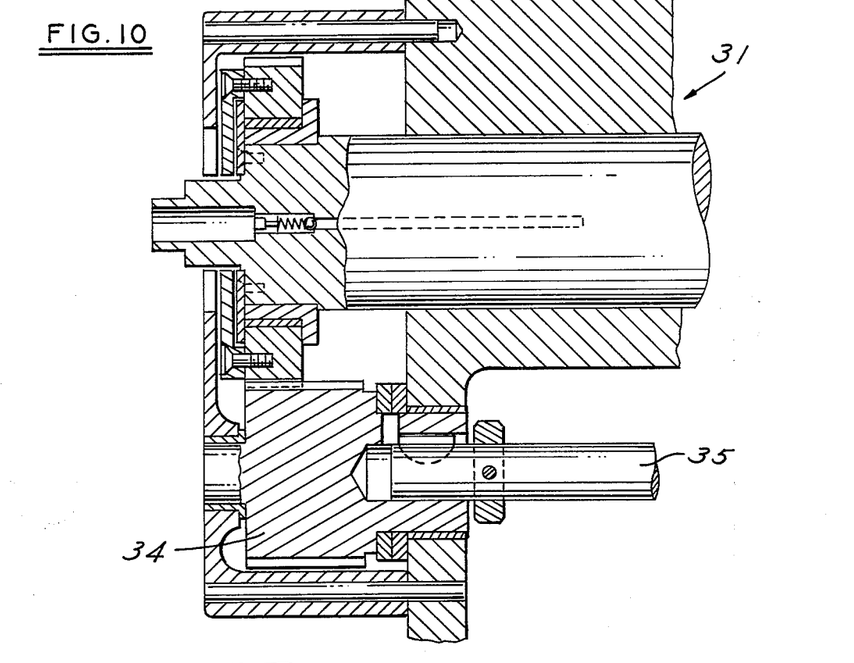
FIG. 10 is an enlarged fragmentary sectional view of the driving head per se of the head stock shown in FIG. 9.
Figure 11:
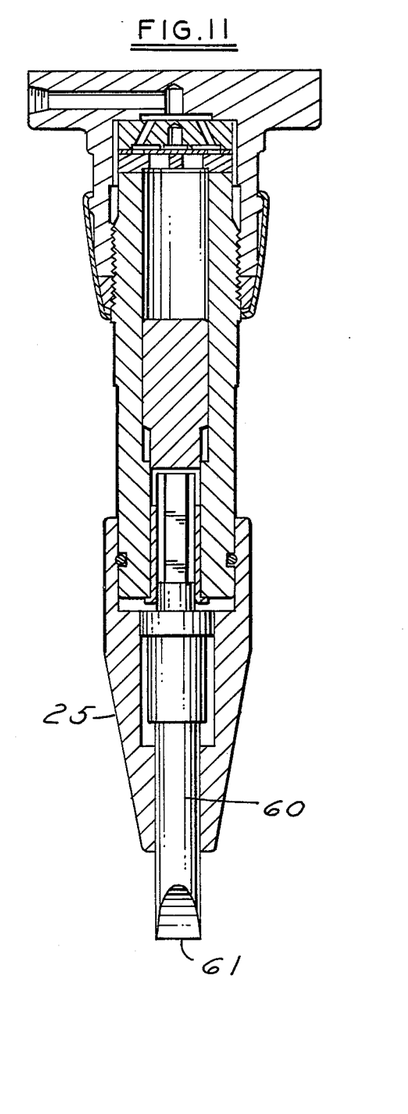
FIG. 11 is an enlarged sectional view of a typical peening head.

With reference to FIGS. 1 and 2, the disclosed embodiment of the cast iron camshaft straightener of the present invention includes camshaft loader 20, transfer 21, head stock 22, tooling bridges 23, peen head mountings 24, peen heads 25, dampening arm 26, gauge mounting 27 and reject station 28. With reference to FIG. 2, tailstock 29 and head stock 22 are provided with adjustments 30, as shown enlarged in FIG. 9, for positioning the entire head stock housing 31. Dead center 32 is advanced and retracted through piston cylinder 33 and gearing 34 driven by shaft 35 from motor 36 rotates drive collar 37, keyed at 38 to engage the flange of a cast iron camshaft, the internal construction of the driving head stock being best shown in the sectional view of FIG. 10.

A rotation control proximity switch or encoder (not shown) monitors the angular position of the camshaft during rotation for controlling actuation of the peening heads as later described.

Figure 3:
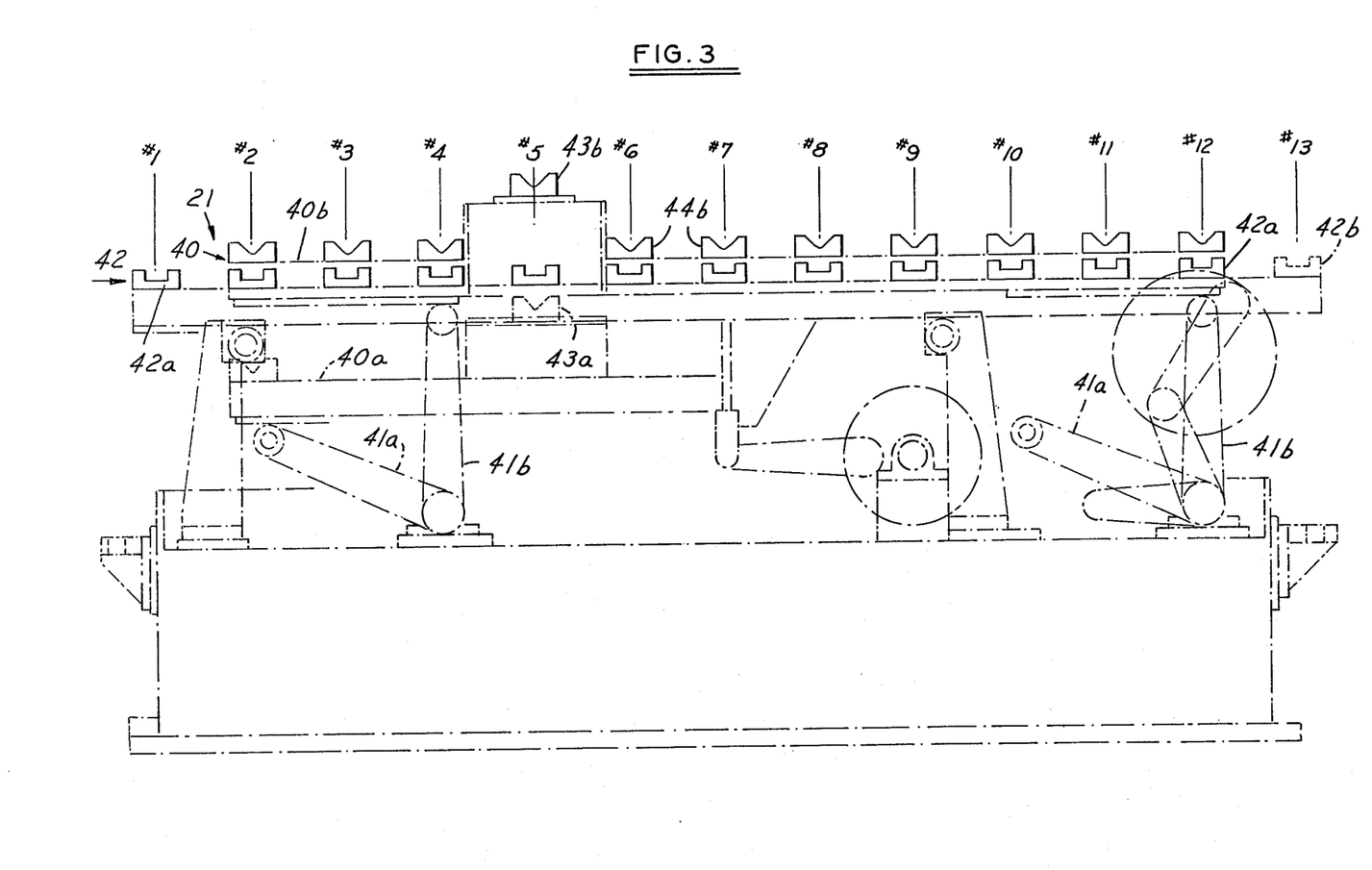
FIG. 3 is an enlarged side elevation illustrating the transfer system employed in the straightener.

With reference to FIG. 3, transfer 21 includes vertical lift station bar 40 raised from level 40a to level 40b by a pair of crank arms having a lower position 41a and raised position 41b, together with a reciprocating beam 42 horizontally indexable from a left position 42a one station to a right position 42b by a power cylinder (not shown), thereby providing means for advancing a series of camshafts from the loader 20 shown in FIG. 1 one station at a time.

Relatively elevated camshaft rests at station No. 5 are raised from position 43a to position 43b between the head and tail stocks where the straightening operation takes place while the corresponding idle positions of idle station rests 44b is also illustrated.

Figure 5:
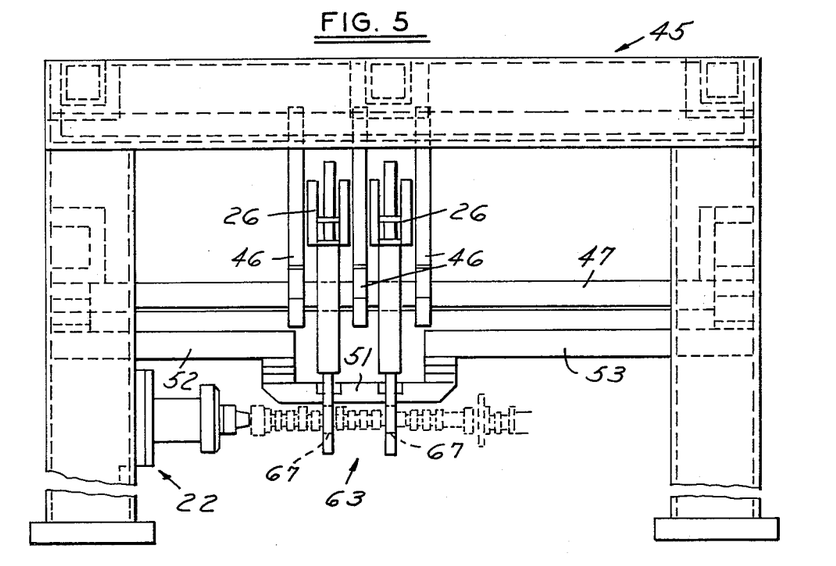
FIG. 5 is an enlarged end elevation illustrating the bridge assembly at the straightening station.
Figure 6:
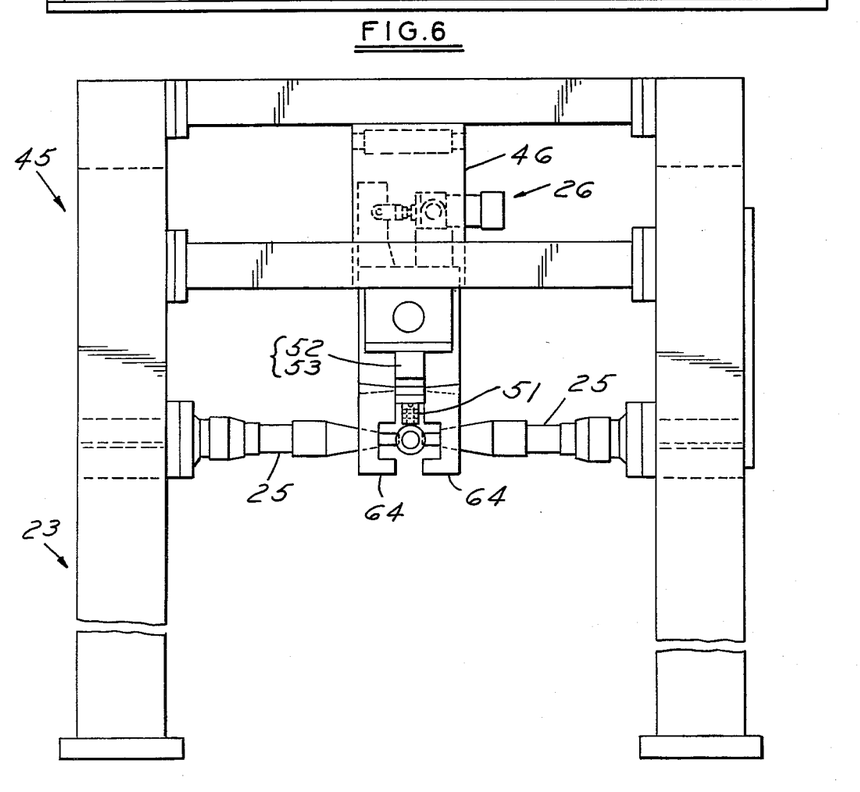
FIG. 6 is a side elevation of the bridge assembly of FIG. 5.

With reference to FIGS. 5 and 6 superstructure framework 45 above bridge assembly 23 provides a rigid mounting for dampener stabilizers 46 secured at lower ends to shaft 47.

With reference to FIG. 6, at the straightening station bridge assembly superstructure 45 supports a pair of dampening arms 26 located between stabilizers 46. Such dampening arms per se being shown in enlarged views of FIGS. 12 and 13.

Figure 7:
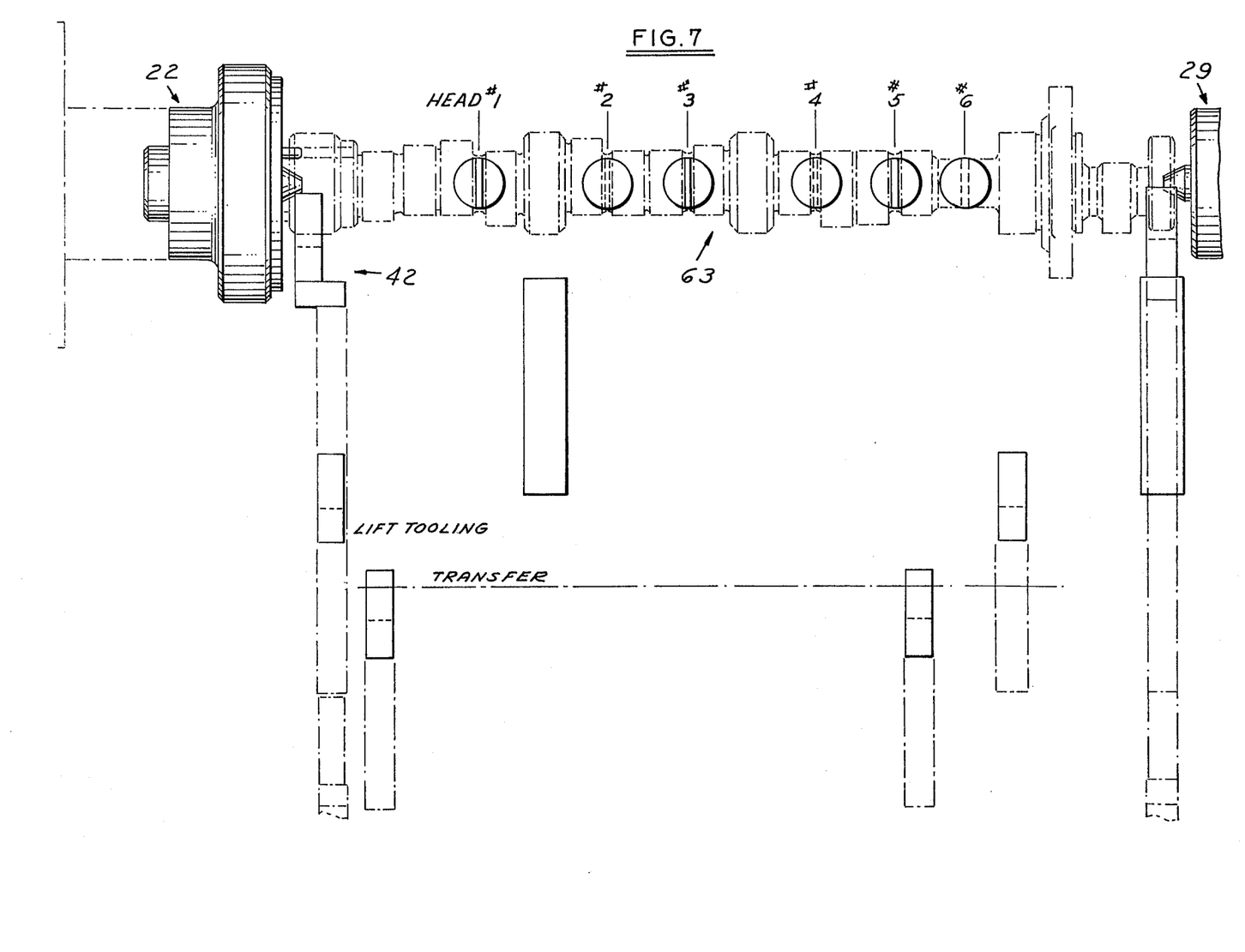
FIG. 7 is a fragmentary view showing the camshaft layout and illustrating the location of the peening heads.
Figure 8:
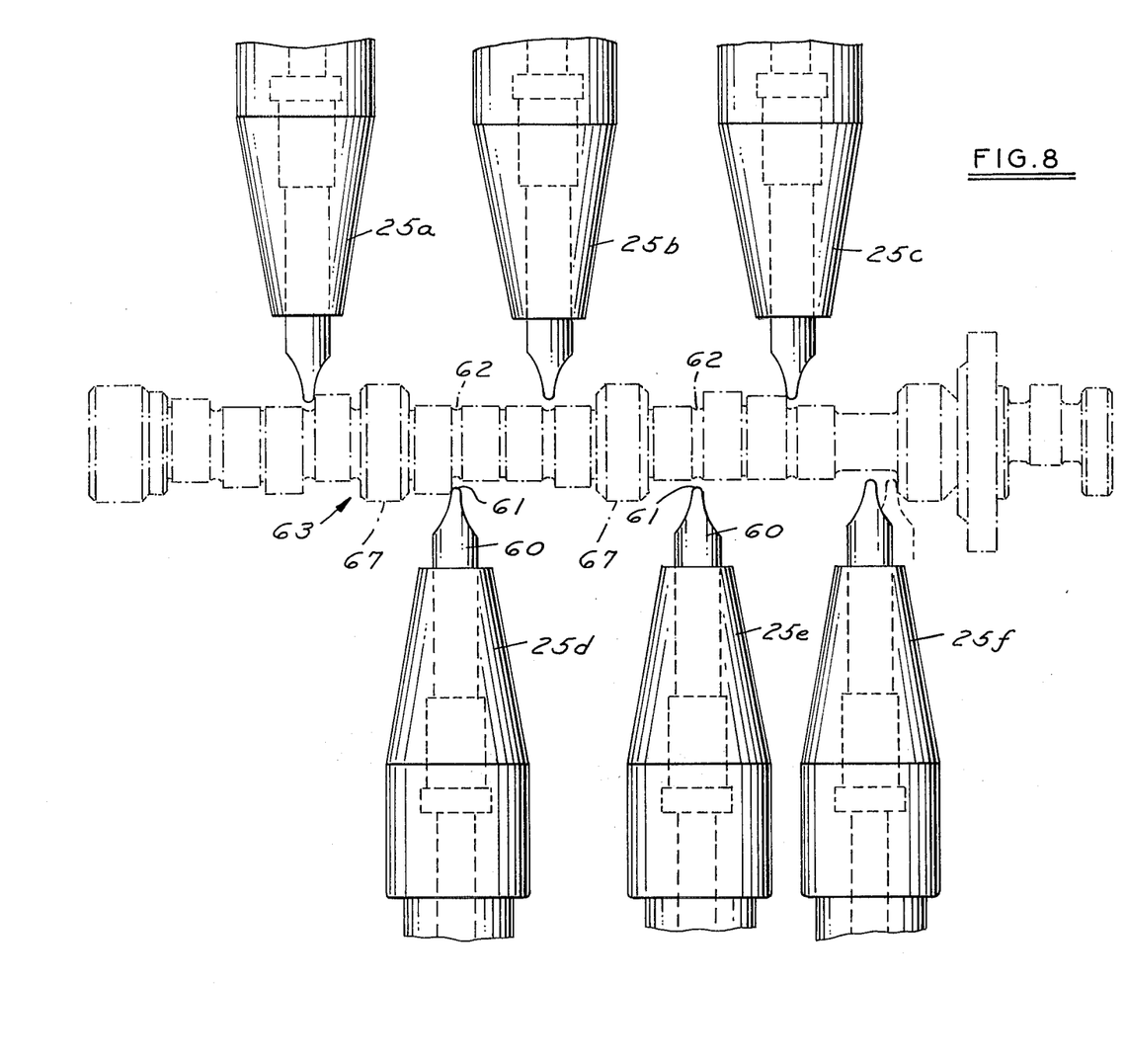
FIG. 8 is a corresponding plan view layout of the camshaft showing alternate location of the peening heads on opposite sides along the length of the camshaft.

With reference to FIGS. 7 and 8, at the straightening station No. 5 as illustrated in FIGS. 1 and 3, head and tail stocks 22 and 29 are advanced to engage camshaft 63 positioning same for rotation between six peening heads 25a, 25b, 25c, 25d, and 25f which are pulsating air hammers of a generally standard construction such as sold under the tradename "THOR" HEAVY-DUTY AIR HAMMER No. 1CH Model 10194A Open Throttle. Special peening tools 60 per se are provided with rounded noses 61 of somewhat smaller radius than corresponding grooves 62 in the camshaft workpiece 63. The six heads are programmed by a control system responsive to the continuously monitoring gauge to operate during a portion of each half of the rotational cycle when the distortion curvature of the camshaft is concave with respect to the peening head thereby imparting straightening compressive stress during continuous rotation of the camshaft until gauge reading within tolerance terminates the straightening cycle.

Figure 12:
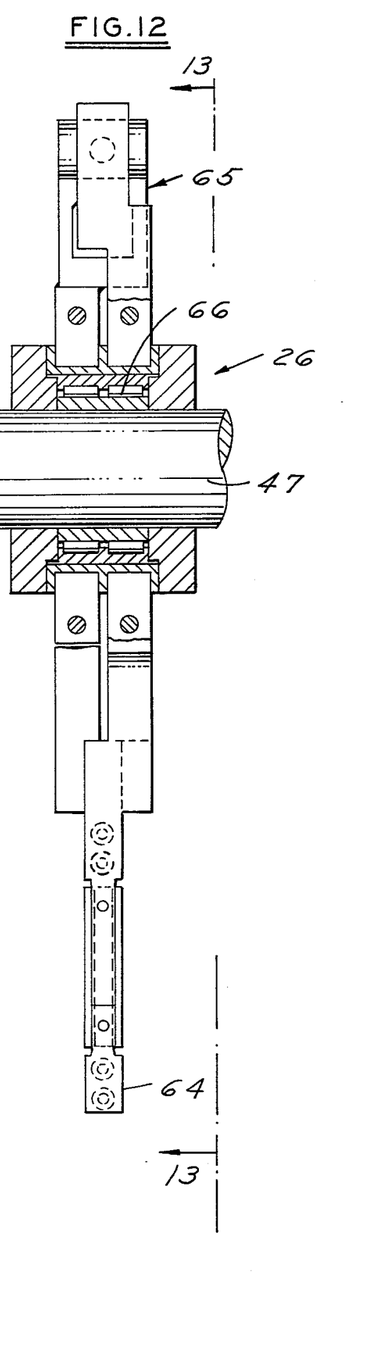
FIG. 12 is a partially sectioned view of a dampening unit.
Figure 13:
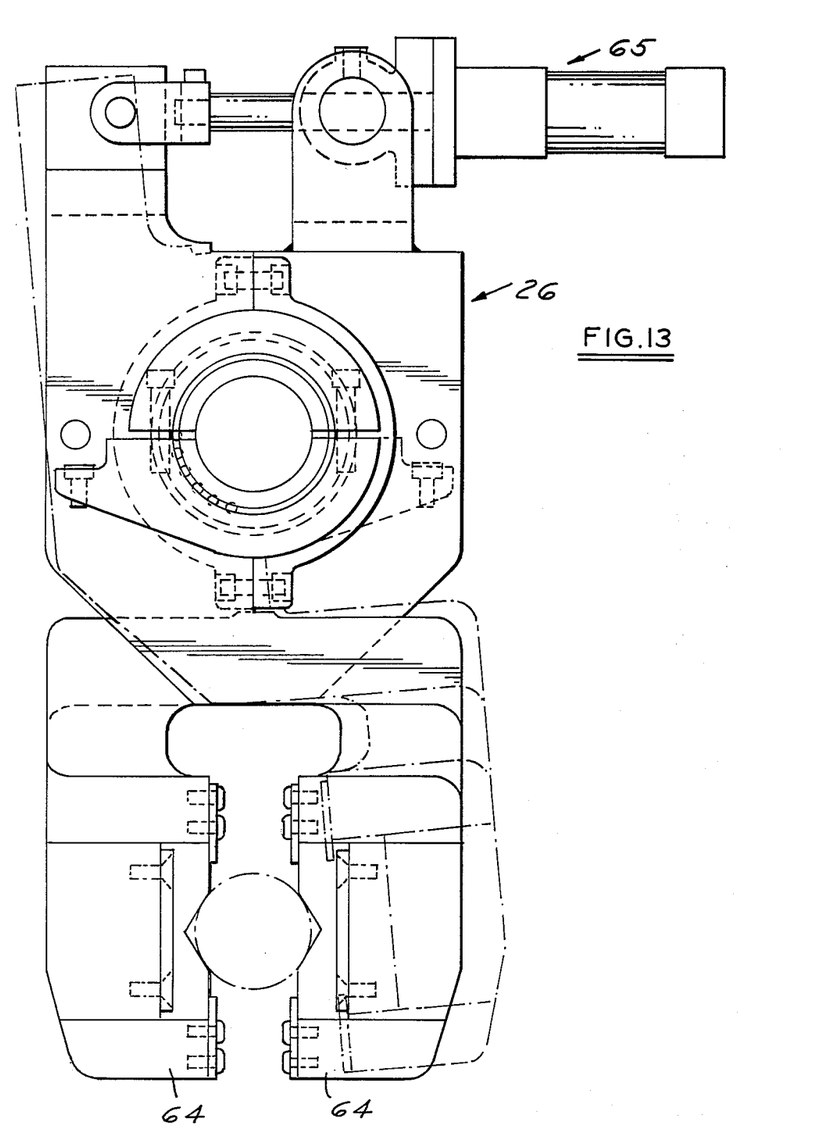
FIG. 13 is a view of the dampening unit taken along the line 13—13 of FIG. 12.

Vibration from the peening blows is dampened by closed scissor arms 64 of dampening head 26 actuated to release and closed positions by power cylinder 65. The dampening unit has roller bearing 66 mounted on shaft 47 to accommodate eccentric rotation of cylindrical bearing surfaces 67 of camshaft 63 during straightening rotation.

The speed of rotation of the camshaft during straightening relative to frequency of peening impulses is preferably regulated to produce a smooth peening mark, e.g. as results from an order of 20 rpm combined with air hammer pulses of 3180 per minute.

Figure 14:
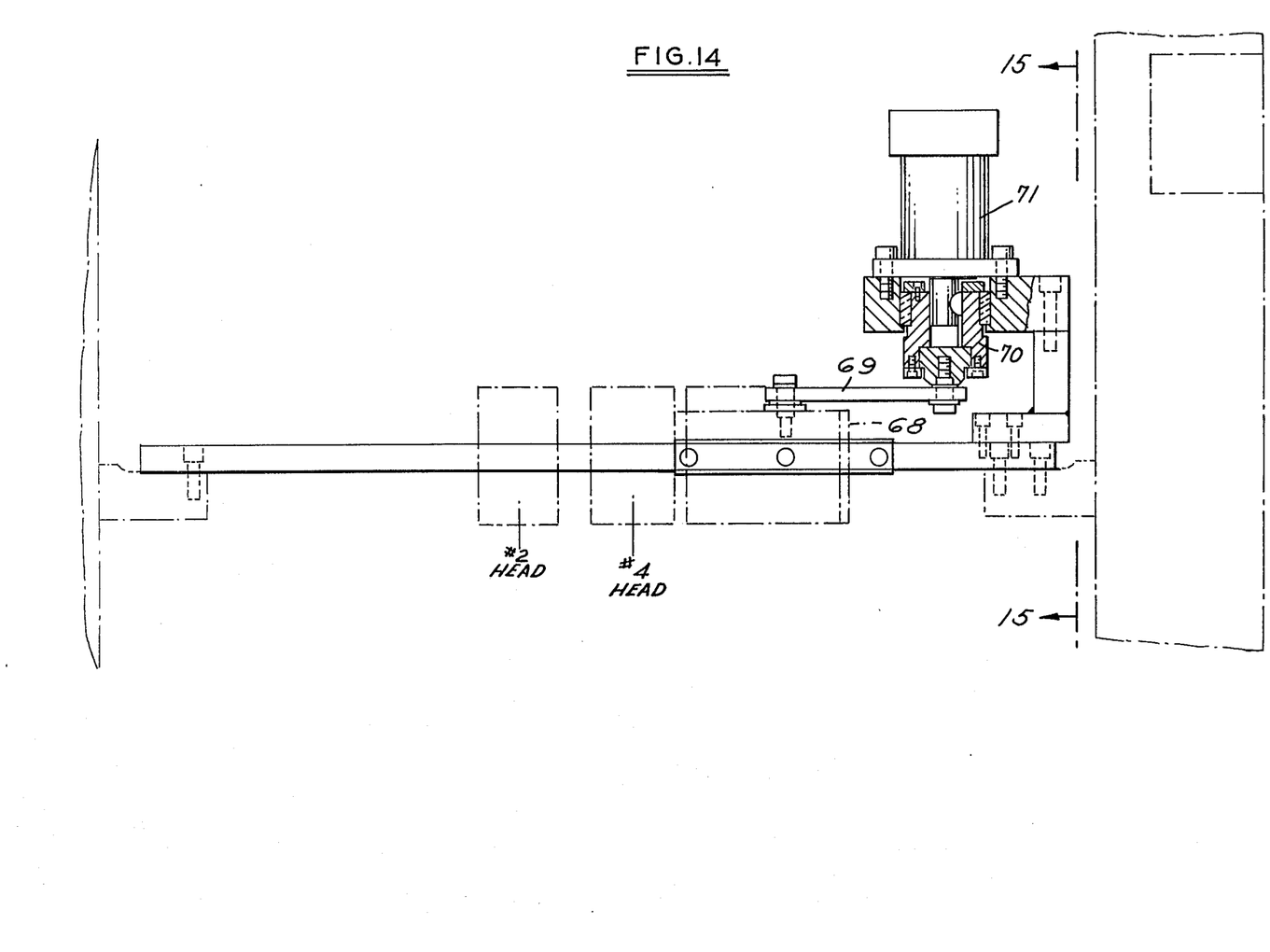
FIG. 14 is a partially sectioned elevation of an oscillating assembly for one of the peening heads.
Figure 15:
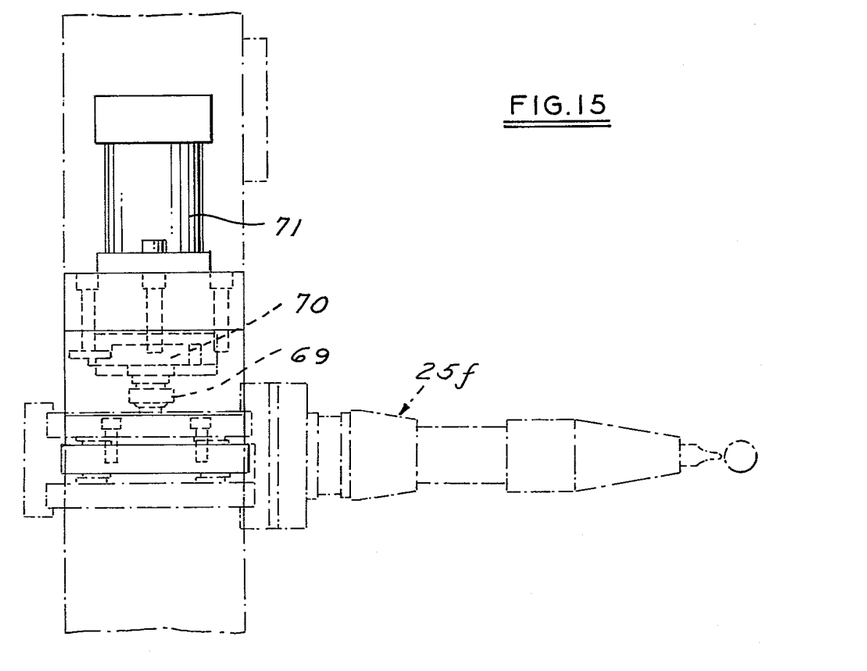
FIG. 15 is a view of the oscillating assembly taken along the line 15—15 of FIG. 14.

At position No. 6 peening head 25f is adapted to oscillate over a substantial width through a mounting illustrated in FIGS. 14 and 15 wherein peening head 25f is secured on slide 68 oscillated through crank arm 69 driven by eccentric 70 from motor 71. For each camshaft reaching the straightening station the sequence of operation will include engagement by head and tail stock.

In the space between dampener jaws 64 of the pair of dampeners 26, a pair of gauges 50 supported on bar 51 suspended from arm 52 extending from the headstock 22 and from arm 53 extending from tail stock 29, are adapted to gauge size and eccentricity of the two cylindrical bearings 67.

A typical straightening cycle for the illustrated camshaft includes the following steps:
1. advance transfer
2. raise part lift
3. extend headstock and tail stock
4. return transfer
5. close dampening arm
6. gauge part
7. straighten part
8. open dampening arm
9. return headstock and tail stock
10. lower part lift The straightening cycle per se with the head and tail stock extended includes the steps of rotating the part one revolution, gauging the plane of distortion, applying the programmed operation of peening heads during continuous rotation of the part to a portion of the half cycle of rotation where concave curvature of the part is facing each peening head with continued rotation and continuous and/or peening-interrupted gauging until part tolerance is reached, terminating the straightening operation. Typical control equipment employed for the disclosed embodiment includes Alan Bradley Power Supply, No. 1774 P1; Alan Bradley Processor, No. 1774 LP3; Alan Bradley Auxiliary Power Supply, No. 1778 P2; two Alan Bradley I/O Rack Assemblies, No. 1778 A1 together with related standard electrical components. A typical control for the oscillating peening head 25f is a "Kamen" Oscillator Demodulator No. KO2300-ISUM with a "Sola" Power Supply No. 83-12-2218.

Specific details for programming the aforementioned controller equipment to achieve desired operations is within knowledge of the art and therefore not disclosed in detail. Furthermore, it will be understood that it is within the scope of the invention to modify the number of peening heads, location, effective arc of peening, individual or group control in response to gauged data to suit individual cases. Severity of peening blows may be regulated by modulating the air pressure for operating the peening heads to suit individual materials and depth of hardness.

The provision for simultaneous peening along longitudinally spaced locations on the shaft during continuous rotation stabilizes and stress relieves the shaft as well as distributing compressive straightening forces over the length of the shaft to maximize the range of effective straightening capacity. Since all resulting surface stresses are compressive, both on the side where fibers are elongated through peening to eliminate concave curvature and the opposite side where fibers are compressed to eliminate convex curvature, cast iron as well as relatively brittle hardened parts including deeply case hardened steel can be effectively straightened without breakage or production of fatigue cracks or weakening surface fibers under tension rendering the part vulnerable to subsequent fatigue failures. In the case of camshafts this method and apparatus for straightening has resulted in a marked improvement in operational performance and durability as compared with prior practice where a high percentage of scrap has resulted from heat treat distortion and where service parts were frequently machined under deflection loading of the bearings creating high bearing stresses and short camshaft life in operation.

The straightening sequence may be tailored to each particular workpiece with regard to number and location of peening heads and straightening program. As a typical example for the illustrated embodiment an initial single rotation of the camshaft with gauging at the cylindrical bearing 67 records the bearing diameter and distortion eccentricity as well as the plane of distortion for each bearing. For substantial runout of both bearings in a single plane of curvature, the program may call for full application of all six peening heads over 120° of each revolution when concave curvatures facing each set of three peening heads (60° on each side of the plane of maximum distortion) for a predetermined cycle time corresponding to and varying with magnitude of initial distortion. A programmed second gauge reading with the peening heads idle may lead to a second timed application of all peening heads over a shorter arc, e.g. an appropriate arc within a range of 45°-90°, again for a time period appropriate for the remaining runout. If one of the bearings when then gauged is within tolerance while the other is still out, the program may shut off one, two or three of the peening heads in the vicinity of the in-tolerance bearing while continuing further application of peening at the other end of the camshaft. Each time the program causes a pause in peening for gauging, the remaining plane of distortion is gauged and any shift will result in a new effective arc of peening relative to the new plane of maximum distortion. Final straightening with extreme precision may be effected through operation of only a single peening head through a relatively few degrees of arc with high rotational speed appropriate for "fine tuning" of precise final straightness. The various programs for different camshaft conditions may of course be adjusted with experience to minimize the total straightening cycle time.

Various optional gauging systems may be employed in addition to that disclosed in FIGS. 5 and 6 described above; for example, with reference to FIG. 16, gauge head 72 mounted on bars 73 as well as 47 extending between head and tail stock ends of bridge assembly 45 includes threaded tube 74 slidable within bushing 75 vertically adjustable through nut 76 held against rotation by bar 77, and pin 78, slidable in bushing 79. Proximity sensitive magnetic gauge 80, protected from damage contact by extensions 81 from irregularities in camshaft bearing surface 82, provides a gauge mounting directly over one of the camshaft bearings which is not involved in the action of a dampening head; or if dampening arms are employed at the same cylindrical bearing where gauging is to take place, the gauging arms and mounting bracket 72 may be offset with the gauging element 80 extending between the arms as in the case of gauge 50 illustrated in FIG. 6.

Figures 16, 17:
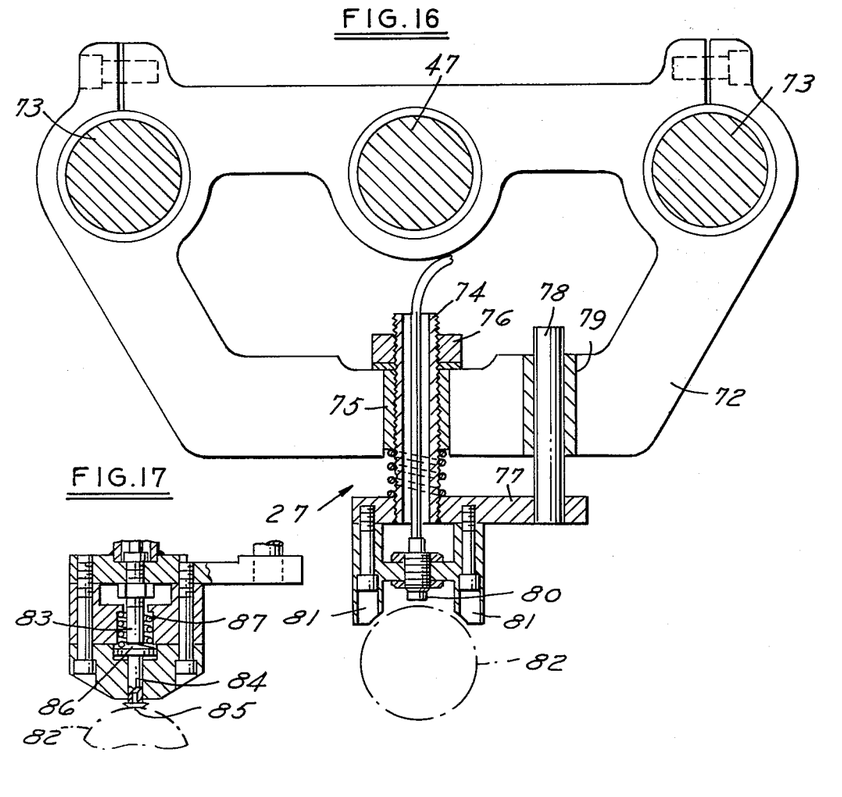
FIG. 16 is an enlarged sectional view of the gauge head illustrated in FIG. 1.
FIG. 17 is a fragmentary sectional view of a modified gauge.

With reference to FIG. 17 an alternative gauge head is illustrated wherein magnetic proximity gauge 83 is substantially spaced from workpiece 82 by an intermediate gauge probe 84 provided with a carbide insert 85 adapted to physically contact the bearing surface during rotation. Any eccentricity is adapted to vary the air gap 86 and proximity gauge reading in a manner which eliminates any misreadings incident to variations in casting porosity, density or material. Spring 87 maintains probe 84 in spaced relation with gauge tip 83 protected from damaging contact.

Through the method and apparatus disclosed herein it has been found possible to straighten cast iron camshafts having an initial distortion as much as 5/16" in a 30" shaft to a stable straight condition where a simple deflection of such camshaft by an amount less than 5/16 would result in breakage. Thus, the distribution of compressive elongation surface fibers to produce a straightening action along multiple locations in the length of the shaft has provided an unprecedented range of effective straightening without breakage.

I claim:

1. Elongated production workpiece straightener characterized by means for gauging magnitude and plane of maximum workpiece distortion, means for peening the workpiece surface, and programmable means responsive to said gauging means for automatically controlling the application of said peening on the concave side of said plane of distortion to effect workpiece straightening through compressive elongation of workpiece surface fibers on said concave side.

2. Workpiece straightener as set forth in claim 1 further characterized by plural means for peening at different locations along the length of said workpiece.

3. Workpiece straightener as set forth in claim 2 including programmable means for selectively controlling individual and simultaneous peening at said different locations.

4. Workpiece straightener as set forth in claim 1, 2 or 3 including means for rotating said workpiece about its axis during said application of peening.

5. Workpiece straightener as set forth in claim 4 including means for selectively peening a limited arc of said workpiece during rotation.

6. Workpiece straightener as set forth in claim 4 including means on each side of said workpiece for selectively peening a limited arc of said workpiece during rotation.

7. Workpiece straightener as set forth in claim 4 including means for selectively peening a limited arc of said workpiece during rotation within a range of 45° to 120°.

8. Workpiece straightener as set forth in claim 4 including means for selectively peening a limited arc of said workpiece during rotation within a range of 45° to 120° and including programmable means for reducing the arc of peening as straightening approaches tolerance requirements.

9. Workpiece straightener as set forth in claim 4 including means for selectively reducing the number of peening locations as well as the effective arc of peening as straightening approaches tolerance requirements.

10. Workpiece straightener as set forth in claim 4 including means for oscillating peening action along a limited length of said workpiece.

11. Workpiece straightener as set forth in claim 4 including means for dampening workpiece vibration resulting from peening.

12. Workpiece straightener as set forth in claim 11 including means for dampening and gauging a common cylindrical portion of said rotating workpiece.

13. An elongated workpiece straightener as set forth in claim 4 including gauging means free of direct workpiece contact.

14. Workpiece straightener as set forth in claim 4 including programmable means for interrupting peening during successive intermediate and final gauging operations.

15. Workpiece straightener as set forth in claim 9 including peening means adapted for cast iron workpiece.

16. Workpiece straightener as set forth in claim 9 including peening means adapted for cast iron camshaft workpiece.

17. Workpiece straightener as set forth in claim 9 including means for peening cylindrical grooves intermediate cam lobes in a cast iron camshaft.

18. Workpiece straightener as set forth in claim 17 including peening tool means having an arcuate impact surface smaller than said grooves.

19. Workpiece straightener as set forth in claim 18 including means providing a frequency of peening impacts relative to rotational speed of said camshaft during peening providing a smooth band of surface working.

20. Workpiece straightener as set forth in claim 19 including means for providing peening impacts in the order of over 3,000 per minute during camshaft rotation in the order of 30 rpm.

21. Workpiece straightener as set forth in claim 4 including air hammer peening tools.

22. Workpiece straightener as set forth in claim 4 including air hammer peening tools adapted for air pressure regulated severity of peening blows.

23. Workpiece straightener as set forth in claim 16 including transfer means for progressively loading and unloading successive workpieces to and from the straightening station.

24. Workpiece straightener as set forth in claim 4 including dead center head and tail stock means for engaging the workpiece during rotation.

25. Workpiece straightener as set forth in claim 4 including scissors type dampening means for engaging opposite sides of a cylindrical portion of the workpiece with floating contact shoes capable of accommodating distortion eccentricity during rotation.

26. Workpiece straightener as set forth in claim 4 including scissors type dampening means for engaging opposite sides of a cylindrical portion of the workpiece with floating contact shoes capable of accommodating distortion eccentricity during rotation, said gauging means extending between scissor arms of said dampening means being adapted to gauge the same cylindrical surface.

27. Method for straightening elongated production workpiece including the steps of, automatically gauging magnitude and plane of maximum workpiece distortion, automatically peening the workpiece surface on the concave side of said plane of distortion to effect workpiece straightening through compressive elongation of workpiece surface fibers on said concave side, automatically changing the circumferential location of said workpiece surface during said peening, automatically gauging the straightening effects of said peening, and automatically controlling the application of further peening until straightening tolerance requirements are met.

28. Method of claim 27 including automatically peening the workpiece surface at different locations along its length.

29. Method of claim 28 including automatically selectively controlling individual and simultaneous peening at said different locations.

30. Method for straightening workpiece as set forth in claim 27, 28, or 29 including rotating said workpiece about its axis during said peening.

31. Method of claim 30 including automatically selectively peening a limited arc of said workpiece during rotation.

32. Method of claim 30 including automatically selectively peening a limited arc on said side of said workpiece.

33. Method of claim 30 including automatically selectively peening a limited arc of said workpiece within a range of 45° to 120°.

34. Method of claim 30 including automatically selectively peening a limited arc of said workpiece within a range of 45° to 120° and including automatically reducing the arc of peening as straightening approaches tolerance requirements.

35. Method of claim 31 including automatic selective reduction in the number of peening locations as well as the effective arc of peening as straightening approaches tolerance requirements.

36. Method of straightening an elongated workpiece as set forth in claim 30 including automatic oscillation of peening action along a limited length of said workpiece.

37. Method of straightening workpiece as set forth in claim 30 including the step of dampening workpiece vibration resulting from peening.

38. Method of straightening workpiece as set forth in claim 30 wherein said workpiece is cast iron.

39. Method of straightening workpiece as set forth in claim 35 wherein said workpiece is cast iron camshaft.

40. Method of straightening cast iron camshaft as set forth in claim 39 including peening cylindrical grooves intermediate cam lobes.

41. Method of straightening cast iron camshaft as set forth in claim 40 including peening with a frequency of peening impacts relative to rotational speed of said camshaft during peening providing a smooth band of surface working.

42. Cast iron camshaft straightener as set forth in claim 16 including adjustable means providing a rotational speed of said camshaft during peening in the order of 20-60 rpm.

* * * * *